United States Patent
Tatedoko

(10) Patent No.: US 10,644,986 B2
(45) Date of Patent: May 5, 2020

(54) MASTER STATION DEVICE, SLAVE STATION DEVICE, PROCESS DELEGATION MANAGEMENT METHOD, AND PROCESS EXECUTION METHOD

(71) Applicant: Mitsubishi Electric Corporation, Tokyo (JP)

(72) Inventor: Masashi Tatedoko, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/061,573

(22) PCT Filed: Feb. 4, 2016

(86) PCT No.: PCT/JP2016/053298
§ 371 (c)(1),
(2) Date: Jun. 12, 2018

(87) PCT Pub. No.: WO2017/134785
PCT Pub. Date: Aug. 10, 2017

(65) Prior Publication Data
US 2018/0367437 A1    Dec. 20, 2018

(51) Int. Cl.
*H04L 12/26* (2006.01)
*H04L 29/08* (2006.01)
(Continued)

(52) U.S. Cl.
CPC ............... *H04L 43/50* (2013.01); *G06F 9/50* (2013.01); *H04L 12/66* (2013.01);
(Continued)

(58) Field of Classification Search
CPC ......... H04L 43/50; H04L 67/10; H04L 12/66; H04L 67/12; H04L 43/0817; G06F 9/50
See application file for complete search history.

(56) References Cited

U.S. PATENT DOCUMENTS

2003/0005068 A1*  1/2003  Nickel ............... G06F 9/5066
                                                     709/208
2006/0282498 A1   12/2006 Muro
(Continued)

FOREIGN PATENT DOCUMENTS

JP    2004-530182 A    9/2004
JP    2006-344017 A   12/2006
(Continued)

OTHER PUBLICATIONS

International Search Report issued in PCT/JP2016/053298 (PCT/ISA/210), dated Apr. 26, 2016.

*Primary Examiner* — Andrew Lai
*Assistant Examiner* — Harry H Kim
(74) *Attorney, Agent, or Firm* — Birch, Stewart, Kolasch & Birch, LLP

(57) ABSTRACT

A delegation state management unit makes a gateway device perform a verification test to verify whether a correct execution result is obtained in a case wherein a process being a delegation candidate is delegated to the gateway device and the process is executed by the gateway device. Further, the delegation state management unit obtains a result of the verification test from the gateway device, and decides whether to delegate execution of the process to the gateway device, based on the result of the verification test obtained.

10 Claims, 15 Drawing Sheets

(51) Int. Cl.
 *H04L 12/66* (2006.01)
 *G06F 9/50* (2006.01)
(52) U.S. Cl.
 CPC .......... *H04L 43/0817* (2013.01); *H04L 67/10* (2013.01); *H04L 67/12* (2013.01)

(56) References Cited

U.S. PATENT DOCUMENTS

| | | |
|---|---|---|
| 2011/0173599 A1 | 7/2011 | Ohama et al. |
| 2012/0159508 A1* | 6/2012 | Katagi ................. G06F 9/5094 718/104 |
| 2014/0372528 A1 | 12/2014 | Nishiguchi |
| 2015/0261601 A1* | 9/2015 | Madden ............ G05B 19/0425 714/807 |
| 2016/0057561 A1 | 2/2016 | Kami |
| 2019/0149898 A1* | 5/2019 | Shang ................ H04Q 11/0066 |

FOREIGN PATENT DOCUMENTS

| | | |
|---|---|---|
| JP | 2010-244141 A | 10/2010 |
| JP | 2011-198379 A | 10/2011 |
| JP | 2013-8180 A | 1/2013 |
| JP | 2014-209311 A | 11/2014 |
| JP | 2015-1784 A | 1/2015 |
| JP | 2015-19154 A | 1/2015 |
| WO | WO 2014/157240 A1 | 10/2014 |

* cited by examiner

Fig. 2

| DEVICE ID 201 | JOB ID 202 | MASTER PROCESS ID 203 | PROCESS ID 204 | DELEGATION DETERMINATION PROCESS ID 205 | DELEGATION STATUS 206 | ALTERNATIVE PROCESS ID 207 |
|---|---|---|---|---|---|---|
| server | j001 | — | ps001 | vs001 | Y | — |
| gw001 | j001 | ps001 | p001 | v001 | Y | ap001 |
| gw002 | j001 | ps001 | p001 | v001 | Y | ap001 |
| gw003 | j001 | ps001 | p001 | v001 | N | ap001 |

Fig.10

| DEVICE ID ~1001 | JOB ID ~1002 | MASTER PROCESS ID ~1003 | PROCESS ID ~1004 | DELEGATION DETERMINATION PROCESS ID ~1005 | DELEGATION STATUS ~1006 | ALTERNATIVE PROCESS ID ~1007 |
|---|---|---|---|---|---|---|
| server | j001 | — | ps001 | vs001 | Y | — |
| gw001 | j001 | ps001 | p001 | v001 | Y | ap001 |
| gw001 | j001 | p001 | p002 | v002 | Y | ap002 |
| gw001 | j001 | p002 | p003 | v003 | Y | ap003 |
| gw002 | j001 | ps001 | p001 | v001 | Y | ap001 |
| gw002 | j001 | p001 | p002 | v002 | ? | ap002 |
| gw002 | j001 | p002 | p003 | v003 | Y | ap003 |
| gw003 | j001 | ps001 | p001 | v001 | N | ap001 |
| gw003 | j001 | p001 | p002 | v002 | N | ap002 |
| gw003 | j001 | p002 | p003 | v003 | Y | ap003 |

Fig. 12

| DEVICE ID 1201 | JOB ID 1202 | MASTER PROCESS ID 1203 | PROCESS ID 1204 | DELEGATION DETERMINATION PROCESS ID 1205 | DELEGATION STATUS 1206 | ALTERNATIVE PROCESS ID 1207 |
|---|---|---|---|---|---|---|
| server | j001 | — | ps001 | vs001 | Y | — |
| gw001 | j001 | ps001 | p001 | v001 | Y | ap001 |
| gw001 | j001 | p001 | p002 | v002 | Y | ap002 |
| gw001 | j001 | p002 | p003 | v003 | Y | ap003 |
| gw002 | j001 | ps001 | p001 | v001 | Y | ap001 |
| gw002 | j001 | p001 | p002 | v002 | Y | ap002 |
| gw002 | j001 | p002 | p003 | v003 | Y | ap003 |
| gw003 | j001 | ps001 | p001 | v001 | N | ap001 |
| gw003 | j001 | p001 | p002 | v002 | N | ap002 |
| gw003 | j001 | p002 | p003 | v003 | Y | ap003 |

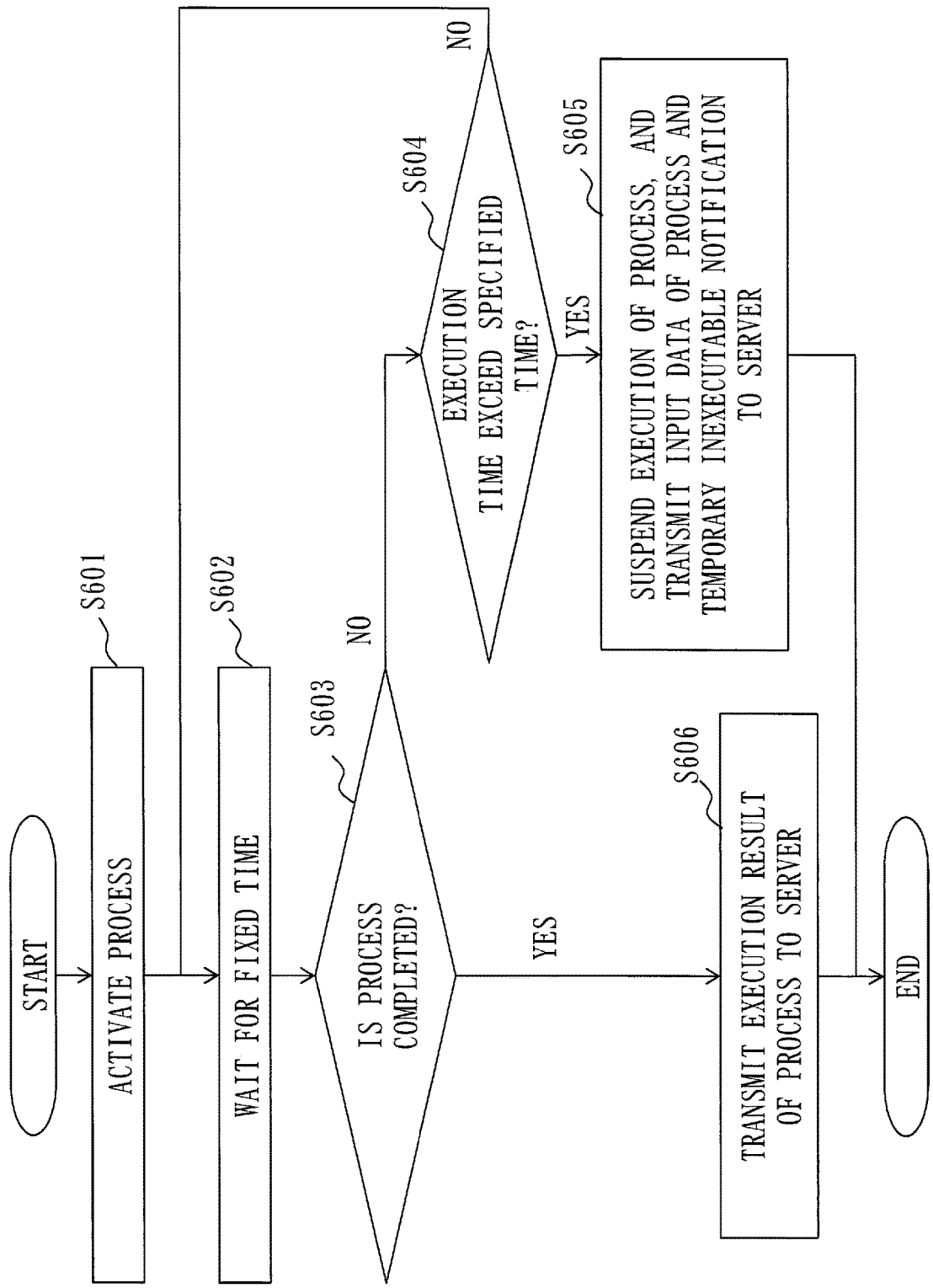

MASTER STATION DEVICE, SLAVE STATION DEVICE, PROCESS DELEGATION MANAGEMENT METHOD, AND PROCESS EXECUTION METHOD

TECHNICAL FIELD

The present invention relates to a technique for delegating execution of a process.

In the present description, a process is a partial program corresponding to a part of a program (hereinafter called a job) executed by a computer in the uppermost level of a hierarchical structure wherein a plurality of computers are hierarchized.

BACKGROUND ART

Patent Literature 1 discloses a technique wherein a computer in the uppermost level delegates execution of a part of a job to a computer in a lower level.

CITATION LIST

Patent Literature

Patent Literature 1: JP 2011-198379 A

SUMMARY OF INVENTION

Technical Problem

In the technique of Patent Literature 1, since a process is delegated without considering whether a correct execution result can be obtained in a delegation destination, there is a problem that a process may be delegated to a delegation destination where a correct execution result cannot be obtained.

The present invention is mainly aimed at resolving such a problem, and is mainly aimed at obtaining a configuration whereby a process is delegated only to a delegation destination where a correct execution result can be obtained.

Solution to Problem

There is provided according to one aspect of the present invention, a master station device includes:

a verification test management unit to make a slave station device perform a verification test to verify whether a correct execution result is obtained in a case wherein a process being a delegation candidate is delegated to the slave station device and the process is executed by the slave station device; and a delegation decision unit to obtain a result of the verification test from the slave station device, and to decide whether to delegate execution of the process to the slave station device, based on the result of the verification test obtained.

Advantageous Effects of Invention

In the present invention, a verification test is performed by a slave station device, and based on the result of the verification test, whether to delegate execution of a process to the slave station device is decided. Therefore, according to the present invention, a process can be delegated only to a slave station device for which it is confirmed by the verification test that a correct execution result can be obtained.

BRIEF DESCRIPTION OF DRAWINGS

FIG. 2 is a diagram illustrating an example of a delegation state management table according to the first embodiment;

FIG. 10 is a diagram illustrating an example of a delegation state management table according to the first embodiment;

FIG. 12 is a diagram illustrating an example of a delegation state management table after update according to the first embodiment;

FIG. 16 is a flowchart illustrating an example of process execution processing in the gateway device according to the second embodiment.

DESCRIPTION OF EMBODIMENTS

First Embodiment

The present embodiment describes a configuration wherein a master station device delegates a process to a slave station device. Here, the master station device is a computer in the uppermost level in a hierarchical structure wherein a plurality of computers is hierarchized. Meanwhile, the slave station device is a computer other than the master station device in the computers included in the hierarchical structure.

In the present embodiment, the master station device makes a slave station device perform a verification test to verify whether a correct execution result can be obtained in a case wherein a process being a delegation candidate is delegated to the slave station and the process is executed by the slave station device. The slave station device performs the verification test, and transmits the result of the verification test to the master station device. The master station device obtains the result of the verification test from the slave station device, and based on the result of the verification test obtained, decides whether to delegate execution of the process to the slave station device. When the execution of the process is delegated from the master station device, the slave station device executes the process, and transmits the execution result obtained by the execution of the process to the master station device. Further, the master station device determines whether the execution of the process is delegated to the slave station device at an execution timing of the process, and when the execution of the process is delegated to the slave station device, obtains the execution result obtained by executing the process in the slave station device, and when the execution of the process is not delegated to the slave station device, executes the process.

Hereinafter, explanation will be provided by taking a server device 101 as an example of the master station device, and a gateway device 111 as an example of the slave station device. Further, the operation of the server device 101 described hereinafter corresponds to an example of a process delegation management method and a process delegation management program, and the operation of the gateway device 111 described hereinafter corresponds to an example of a process execution method and a process execution program.

Here, in the following, the server device 101 may be simply called a server, and the gateway device 111 may be simply called a gateway.

*Explanation of Configuration*

Figure 1:
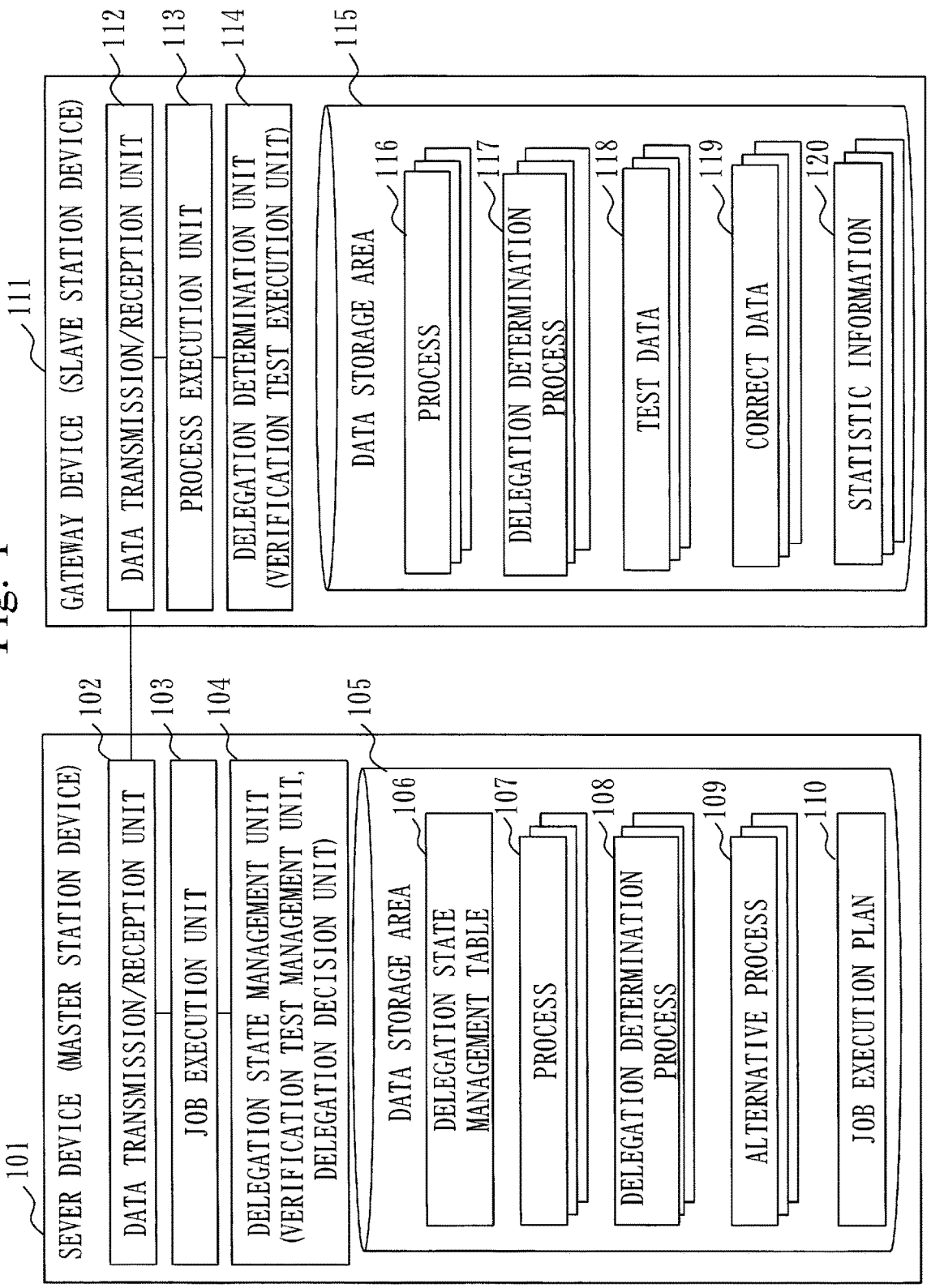
FIG. 1 is a diagram illustrating an example of a functional configuration of a server device and a gateway device according to a first embodiment.

FIG. 1 illustrates an example of a functional configuration of the server device 101 and the gateway device 111 according to the present embodiment.

Figure 5:
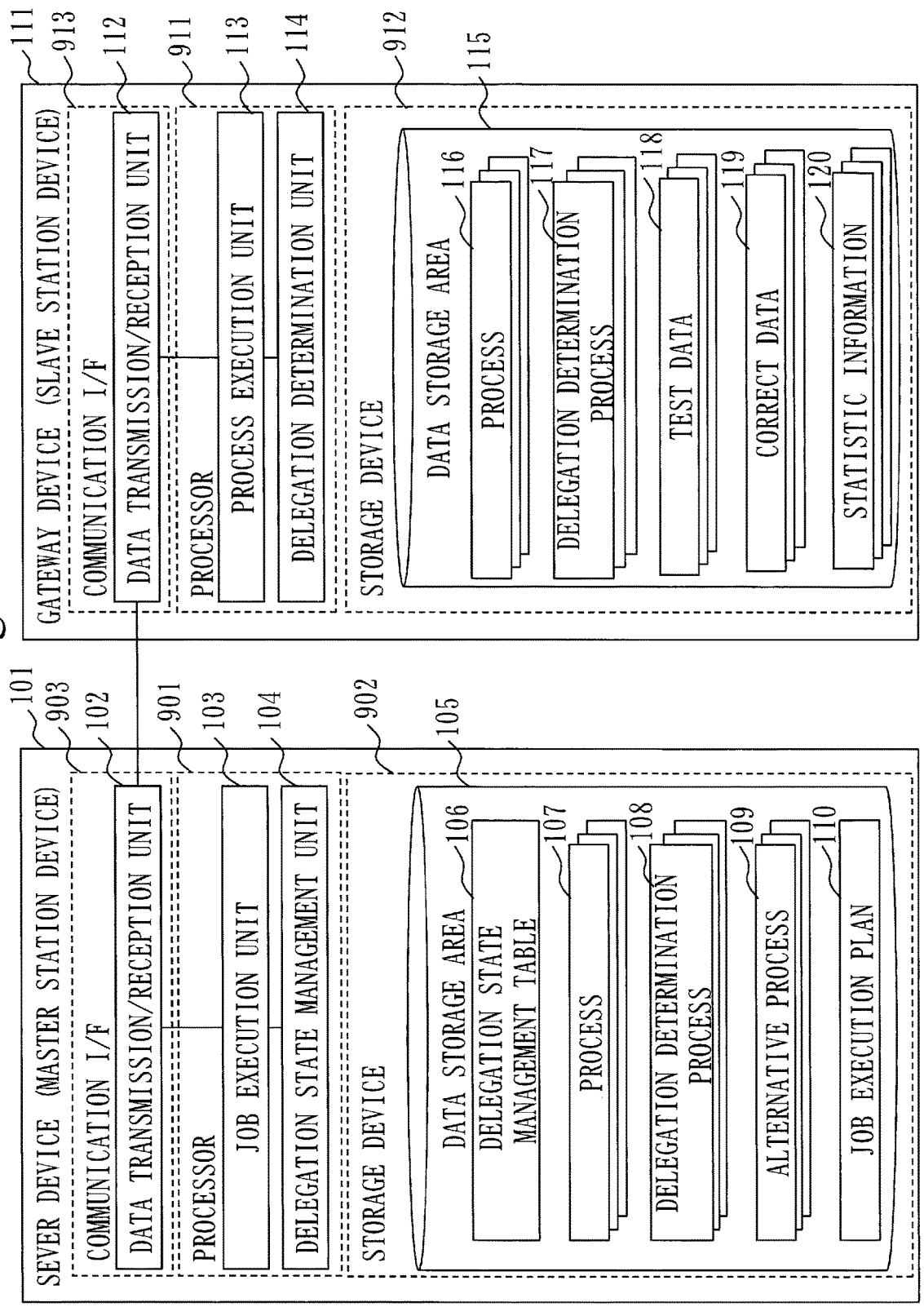
FIG. 5 is a diagram illustrating an example of a hardware configuration of the server device and the gateway device according to the first embodiment.

FIG. 5 illustrates an example of a hardware configuration of the server device 101 and the gateway device 111 according to the present embodiment.

As illustrated in FIG. 5, the server device 101 is equipped with a processor 901, a storage device 902 and a communication interface 903, as hardware.

Further, as illustrated in FIG. 1, the server device 101 is equipped with a data transmission/reception unit 102, a job execution unit 103, a delegation state management unit 104 and a data storage area 105, as functional components.

The communication interface 903 is a circuit to communicate with the gateway device 111. The data transmission/reception unit 102 is realized by the communication interface 903.

The storage device 902 constitutes the data storage area 105.

Further, the storage device 902 stores programs to realize functions of the job execution unit 103 and the delegation state management unit 104.

Then, the processor 901 executes those programs, and performs operations of the job execution unit 103 and the delegation state management unit 104 as described below.

FIG. 5 schematically illustrates a state wherein the processor 901 executes the programs to realize the functions of the job execution unit 103 and the delegation state management unit 104.

As illustrated in FIG. 5, the gateway device 111 is equipped with a processor 911, a storage device 912 and a communication interface 913, as hardware.

Further, as illustrated in FIG. 1, the gateway device 111 is equipped with a data transmission/reception unit 112, a process execution unit 113, a delegation determination unit 114 and a data storage area 115, as functional components.

The communication interface 913 is a circuit to communicate with the server device 101. The data transmission/reception unit 112 is realized by the communication interface 913.

The storage device 912 constitutes the data storage area 115.

Further, the storage device 912 stores programs to realize the functions of the process execution unit 113 and the delegation determination unit 114.

Then, the processor 911 executes those programs, and performs operations of the process execution unit 113 and the delegation determination unit 114 as described below.

FIG. 5 schematically illustrates a state wherein the processor 911 executes the programs to realize the functions of the process execution unit 113 and the delegation determination unit 114.

The data storage area 105 stores a delegation state management table 106, a process 107, a delegation determination process 108, an alternative process 109 and a job execution plan 110.

The data storage area 115 stores a process 116, a delegation determination process 117, test data 118, correct data 119 and statistic information 120.

The delegation state management table 106 is information as illustrated in FIG. 2, for example. The delegation state management table 106 is composed of a device ID 201, a job ID 202, a master process ID 203, a process ID 204, a delegation determination process ID 205, a delegation status 206 and an alternative process ID 207.

In the field of the device ID 201, identifiers of the server device 101 and the gateway device 111 are described. In the example of FIG. 2, three pieces of gateway devices 111 exist.

In the field of the job ID 202, identifiers of the job execution plan 110 are described.

In the field of the master process ID 203, an identifier of a process in the uppermost level of processes included in the job execution plan 110 is described. In other words, the process described in the field of the master process ID 203 is a master process of a process described in the field of the process ID 204.

In the field of the process ID 204, identifiers of processes included in the job execution plan described in the field of the job ID 202 are described.

In the field of the delegation determination process ID 205, identifiers of delegation determination processes are described. The delegation determination processes will be described below.

In the field of the delegation status 206, it is described whether a process described in the field of the process ID 204 is delegated to the gateway device 111. In the field of the delegation status 206, any of three of "Y", "N", "?" is described. "Y" indicates that the process is delegated to the gateway device 111. "N" indicates that the process is not delegated to the gateway device 111. "?" indicates that a verification test as to whether delegation of the process is possible or not is being performed.

In the field of the alternative process ID 207, identifiers of alternative processes are described. The alternative processes will be described below.

Here, an ID of a process executable only in the server device 101 starts with "ps" as "ps001" in FIG. 2. Further, an ID of a process delegated to the gateway device 111 or an ID of a process being a delegation candidate to the gateway device 111 starts with "p" in "p001" in FIG. 2. Furthermore, an ID of an alternative process starts with "ap" as "ap001" in FIG. 2. Further, an ID of a delegation determination process starts with "vs" or "v" as "vs 001" or "v001" in FIG. 2.

The process 107 is transmitted to the gateway device 111 from the server device 101 as a process being a delegation candidate. Further, the delegation determination process 108, the test data and the correct data are also transmitted from the server device 101 to the gateway device 111.

The process 107 transmitted from the server device 101 is stored in the data storage area 115 as the process 116 in the gateway device 111. Further, the delegation determination process 108, the test data and the correct data transmitted from the server device 101 are also stored in the data storage area 115 as the delegation determination process 117, the test data 118 and the correct data 119 in the gateway device 111.

The delegation determination process 117 (delegation determination process 108) is a program to make the gateway device 111 determine whether the execution result of the process 116 coincides with the correct data 119.

The test data 118 is data to be used at the time of executing the process 116. The correct data 119 is data wherein a correct execution result obtained by execution of the process 116 using the test data 118 is described.

The gateway device 111 executes the process 116 using the test data, as a verification test, and determines whether the execution result of the process 116 coincides with the correct data 119 by using the delegation determination process 117.

The alternative process 109 is a program to be executed in the server device 101 instead of the process 116 (process 107), when the process 116 (process 107) cannot be delegated to the gateway device 111. When the server device 101 can execute the process 107, the alternative process 109 needs not be prepared.

The process 107, the delegation determination process 108, the alternative process 109, the process 116 and the delegation determination process 117 may be, for example, those described in a native code, those compiled into an intermediate language, or those to be executed by an interpreter like a scripting language.

The statistic information 120 indicates static values of a data flow rate, an execution time of a process, central processing unit (CPU) utilization and input/output (IO) utilization at the time of executing a process and the like.

Figure 3:
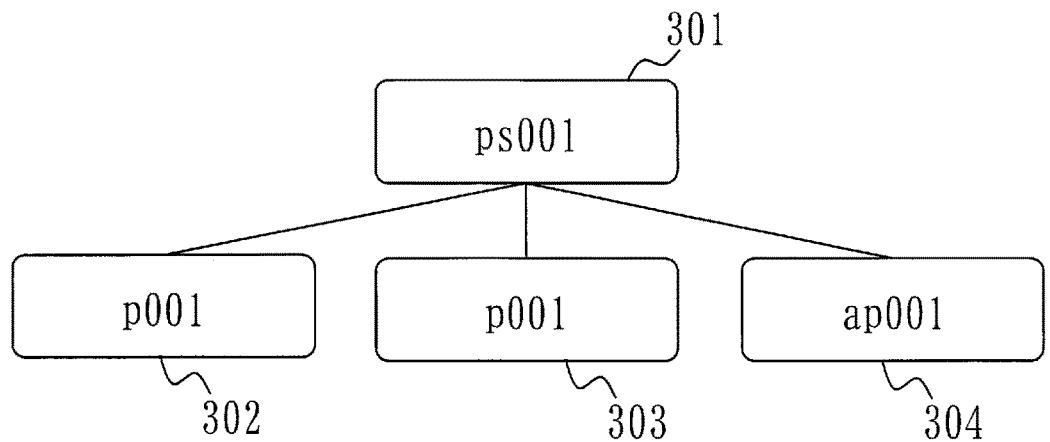
FIG. 3 is a diagram illustrating an example of a job execution plan according to the first embodiment.

The job execution plan 110 is information illustrated in FIG. 3, for example. The job execution plan 110 holds an execution order of a process for each job in a form of a tree structure using the information described in the delegation state management table 106. A root node of the job execution plan 110 is a process 301 executed in the server device 101. Processes 302 and 303 being leaf nodes are executed in the gateway device 111. That is, the processes 302 and 303 are processes delegated to the gateway device 111. Further, the process 304 being the leaf node is an alternative process.

In nodes other than the root nodes, any of execution of the process 116 in the gateway device 111 or execution of the alternative process 109 in the server device 101 is performed.

Since the hierarchical structure in FIG. 3 has two layers, no intermediate node exists; however, in a hierarchical structure having three or more than three layers, an intermediate node exists. A gateway device 111 to be located in an intermediate node receives an execution result of a process in a gateway device 111 located in a lower level node, and executes a process in response to the execution result received. Then, the gateway device 111 located in the intermediate node transfers a new execution result by the execution of the process to a gateway device 111 located in an upper level node, or the server device 101.

Figure 4:
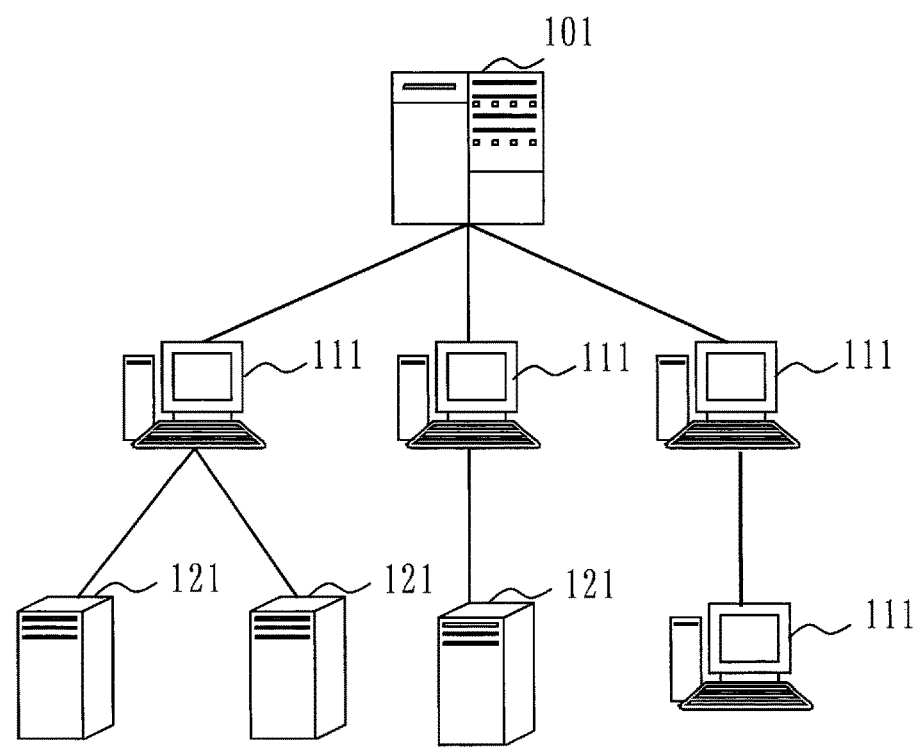
FIG. 4 is a diagram illustrating an example of a hierarchical structure according to the first embodiment.

FIG. 4 illustrates a hierarchical structure wherein the server device 101 and a plurality of gateway devices 111 are included.

Sensing devices 121 only having a function to transmit data may be located under the gateway devices 111. Further, the gateway devices 111 may be configured to include the sensing devices 121 inside. Furthermore, a gateway device 111 may be further located under a gateway device 111. In the case wherein the gateway device 111 is located under the gateway device 111, for the lower level gateway device 111, the upper level gateway device 111 being higher by one level corresponds to a master station device. Further, for the upper level gateway device 111, the lower level gateway device 111 being lower by one level corresponds to a slave station device.

Note that there may be a plurality of gateway devices 111 under the server device 101.

*Explanation of Operation*

Next, the operation of the data transmission/reception unit 102, the job execution unit 103 and the delegation state management unit 104 of the server device 101 will be discussed.

The data transmission/reception unit 102 transmits the process 107, the delegation determination process 108, the test data and the correct data to the gateway device 111 based on direction from the delegation state management unit 104. Further, the data transmission/reception unit 102 receives a result of a verification test from the gateway device 111.

Furthermore, the data transmission/reception unit 102 receives an execution result of a process delegated to the gateway device 111 from the gateway device 111.

The delegation state management unit 104 makes the gateway device 111 perform a verification test to verify whether a correct execution result is obtained in a case wherein a process being a delegation candidate is delegated to the gateway device 111 and the process is executed in the gateway device 111. More specifically, the delegation state management unit 104 transmits the process 107, the delegation determination process 108, the test data and the correct data to the gateway device 111 via the data transmission/reception unit 102, and makes the gateway device 111 perform the verification test.

The delegation state management unit 104 makes the gateway device 111 estimate a data volume of data to be used by the gateway device 111 in execution of a process 116 in a case wherein the process 116 is delegated to the gateway device 111. Then, the delegation state management unit 104 makes, as the verification test, the gateway device 111 perform execution of the process 116 using the test data 118 whose data volume has been adjusted, makes the gateway device 111 execute the delegation determination process 117, and thereby makes the gateway device 111 determine whether the execution result of the process 116 coincides with the correct data, and whether the execution of the process 116 is completed within a prescribed time.

Further, the delegation state management unit 104 obtains a result of the verification test from the gateway device 111 via the data transmission/reception unit 102. Then, the delegation state management unit 104 decides whether to delegate the execution of the process 116 to the gateway device 111 based on the result of the verification test obtained. More specifically, in a case wherein the delegation state management unit 104 receives a determination result of the gateway device 111, as the result of the verification test, from the gateway device 111, and wherein the determination result indicates that the execution result of the process 116 coincides with the correct data and the execution of the process 116 is completed within the prescribed time, the delegation state management unit 104 decides to delegate the execution of the process 116 to the gateway device 111.

Furthermore, the delegation state management unit 104 updates the delegation state management table 106 based on the result of the verification test.

The delegation state management unit 104 corresponds to an example of a verification test management unit and a delegation decision unit. The operation performed by the delegation state management unit 104 corresponds to an example of verification test management processing and delegation decision processing.

The job execution unit 103 executes a job in accordance with the job execution plan 110. The job execution unit 103 determines whether execution of a process being a target is delegated to the gateway device 111 by the delegation state management unit 104 at an execution timing of each process included in the job execution plan 110. Then, when execution of the process being the target is delegated to the gateway device 111, the job execution unit 103 obtains an execution result which has been obtained by executing the process in the gateway device 111. Meanwhile, when execution of the process is not delegated to the gateway device 111, the job execution unit 103 executes the alternative process 109.

Next, the operation of the data transmission/reception unit 112, the process execution unit 113 and the delegation determination unit 114 of the gateway device 111 will be described.

In the following, explanation is mainly provided of a case wherein a process is delegated to the gateway device 111 from the server device 101; meanwhile, as illustrated in FIG. 4, when a gateway device 111 is located under a gateway 111, there is a case in which a process is delegated to a lower level gateway device 111 from an upper level gateway device 111. In this case, the description of the "server device 101" in the following is replaced with the "upper level gateway device 111". Further, in this case, the upper level gateway device 111 corresponds to a master station device for the lower level gateway device 111.

The data transmission/reception unit 112 receives data from the sensing device 121 or the lower level gateway device 111, and transmits an execution result of the process 116 to the server device 101.

Further, the data transmission/reception unit 112 receives a process 107, a delegation determination process 108, test data and correct data transmitted from the server device 101.

Further, the data transmission/reception unit 112 transmits a result of a verification test by the delegation determination unit 114 to the server device 101.

The delegation determination unit 114 obtains the process 107, the delegation determination process 108, the test data and the correct data transmitted from the server device 101 via the data transmission/reception unit 112. Further, the delegation determination unit 114 stores the process 107, the delegation determination process 108, the test data and the correct data as the process 116, the delegation determination process 117, the test data 118 and the correct data 119, in the data storage area 115.

Further, the delegation determination unit 114 performs the verification test, and transmits the result of the verification test to the server device 101 via the data transmission/reception unit 112.

The delegation determination unit 114 estimates, in a case wherein the process 116 is delegated, a data volume of the data to be used in execution of the process 116, and adjusts the data volume of the test data 118 so as to be the data volume estimated. Then, the delegation determination unit 114 executes, as a verification test, a process using the test data 118 whose data volume has been adjusted. By executing the delegation determination process 117, the delegation determination unit 114 determines whether the execution result of the process 116 coincides with the correct data 119 and whether the execution of the process 116 is completed within the prescribed time. Further, the delegation determination unit 114 performs the verification test in a time period when calculation load is statistically high.

The delegation determination unit 114 corresponds to an example of a verification test execution unit. Further, the operation performed by the delegation determination unit 114 corresponds to an example of verification test execution processing.

When the execution of the process 116 is delegated from the server device 101, the process execution unit 113 executes the process 116, and transmits an execution result obtained by executing the process 116 to the server device 101 via the data transmission/reception unit 112.

Further, the process execution unit 113 records information on an execution time, CPU utilization and I/O utilization, etc. at the time of executing the process 116 in the statistic information 120.

Figure 6:
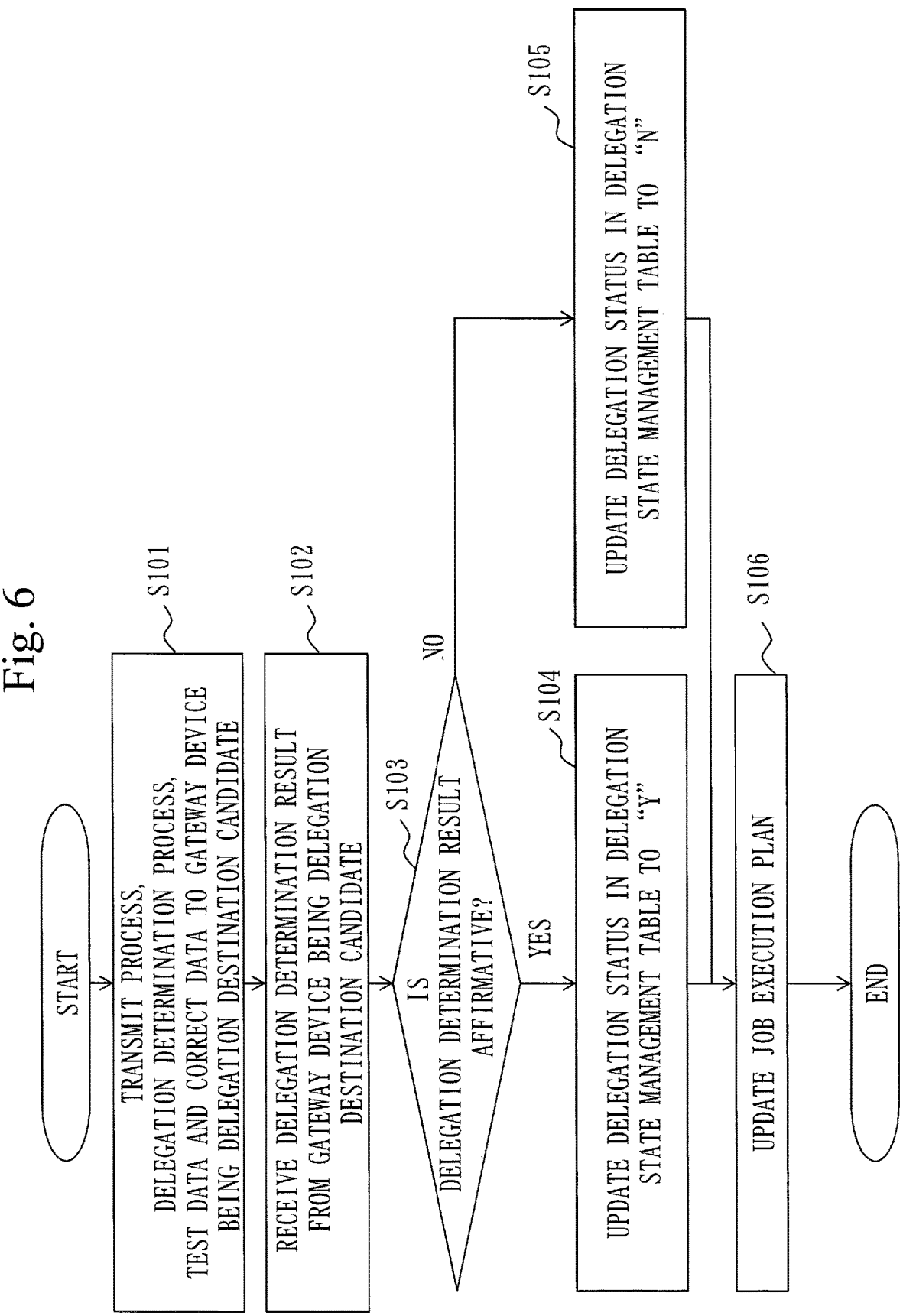
FIG. 6 is a flowchart illustrating an example of delegation state management table update processing in the server device according to the first embodiment.

Next, based on the flowchart illustrated in FIG. 6, delegation state management table update processing by the delegation state management unit 104 of the server device 101 will be discussed.

In a step S101, the data transmission/reception unit 102 transmits a process, a delegation determination process, test data and correct data to a gateway device 111 being a candidate of a delegation destination. Here, the delegation state management unit 104 adds a set of a device ID, a job ID, a master process ID, a process ID, a delegation determination process ID and an alternative process ID to the delegation state management table 106. Further, the delegation state management unit 104 specifies a row to be updated inside the delegation state management table 106 by taking the device ID and the delegation determination process ID as a key, and updates the delegation status 206 to "?".

In a step S102, the data transmission/reception unit 102 receives a delegation determination result being a result of a verification test from the gateway device 111.

In a step S103, the delegation state management unit 104 obtains the delegation determination result from the data transmission/reception unit 102, and interprets the delegation determination result.

When the delegation determination result is affirmative, processing proceeds to a step S104. Meanwhile, when the delegation determination result is negative, processing proceeds to a step S105.

The affirmative delegation determination result is a delegation determination result in a case wherein an execution result of a process in the gateway device 111 coincides with the correct data 119, and the execution of the process in the gateway device 111 is completed within a prescribed time. Meanwhile, the negative delegation determination result is a delegation determination result in at least one of a case wherein an execution result of the process in the gateway device 111 does not coincide with the correct data 119, and a case wherein the execution of the process in the gateway device 111 is not completed within the prescribed time.

In a step S104, the delegation state management unit 104 specifies a row to be updated inside the delegation state management table 106 by taking the device ID and the delegation determination process ID as a key, and updates the delegation status 206 to "Y".

That is, the delegation state management unit 104 decides to delegate the execution of the process to the gateway device 111.

In a step S105, the delegation state management unit 104 specifies a row to be updated inside the delegation state management table 106 by taking the device ID and the delegation determination process ID as a key, and updates the delegation status 206 to "N".

That is, the delegation state management unit 104 decides not to delegate the execution of the process to the gateway device 111.

In a step S106, the delegation state management unit 104 restructures the job execution plan 110 in accordance with the delegation status of the process.

Next, based on the flowchart illustrated in FIG. 7, job execution processing by the job execution unit 103 of the server device 101 will be discussed.

In a step S201, the job execution unit 103 obtains the job execution plan 110.

In a step S202, the job execution unit 103 traces the job execution plan 110 from the root node by depth-first search, and searches for a node which is not marked as executed, other than the root node.

In a step S203, when a node which is not marked as executed is found, processing proceeds to S204. Meanwhile, when a node which is not marked as executed is not found, processing proceeds to S209.

In a step S204, when the node obtained is a process delegated, processing proceeds to a step S205, and when the node obtained is not a process delegated, processing proceeds to a step S206.

In the step S205, the job execution unit 103 obtains an execution result of the gateway device 111.

In the present embodiment, it is assumed that the process delegated to the gateway device 111 is to be autonomously executed in the gateway device 111 without an execution direction from the server device 101. For example, the process may be executed periodically in the gateway device 111, or the process may be executed every time the data transmission/reception unit 112 receives data. The gateway device 111 transmits an execution result to the server device 101 every time the gateway device 111 executes a process. In the server device 101, every time the execution result is transmitted from the gateway device 111, the data transmission/reception unit 102 receives the execution result, and stores the execution result received in the data storage area 105. The job execution unit 103 obtains the execution result in the gateway device 111 from the data storage area 105 at a timing of the step S205, i.e., at an execution timing of the process delegated.

In the step S206, the job execution unit 103 executes the alternative process 109.

In a step S207, the job execution unit 103 passes the execution result to the master process. When the job execution unit 103 obtains the execution result in the gateway device 111 in the step S205, the job execution unit 103 passes the execution result obtained to the master process. Meanwhile, when the alternative process 109 is executed in the step S206, the job execution unit 103 passes the execution result of the alternative process 109 to the master process.

In a step S208, the job execution unit 103 marks the node obtained in the step S203 as executed in the job execution plan 110.

In a step S209, the job execution unit 103 executes a process of the root node, and returns the execution result.

Figure 8:
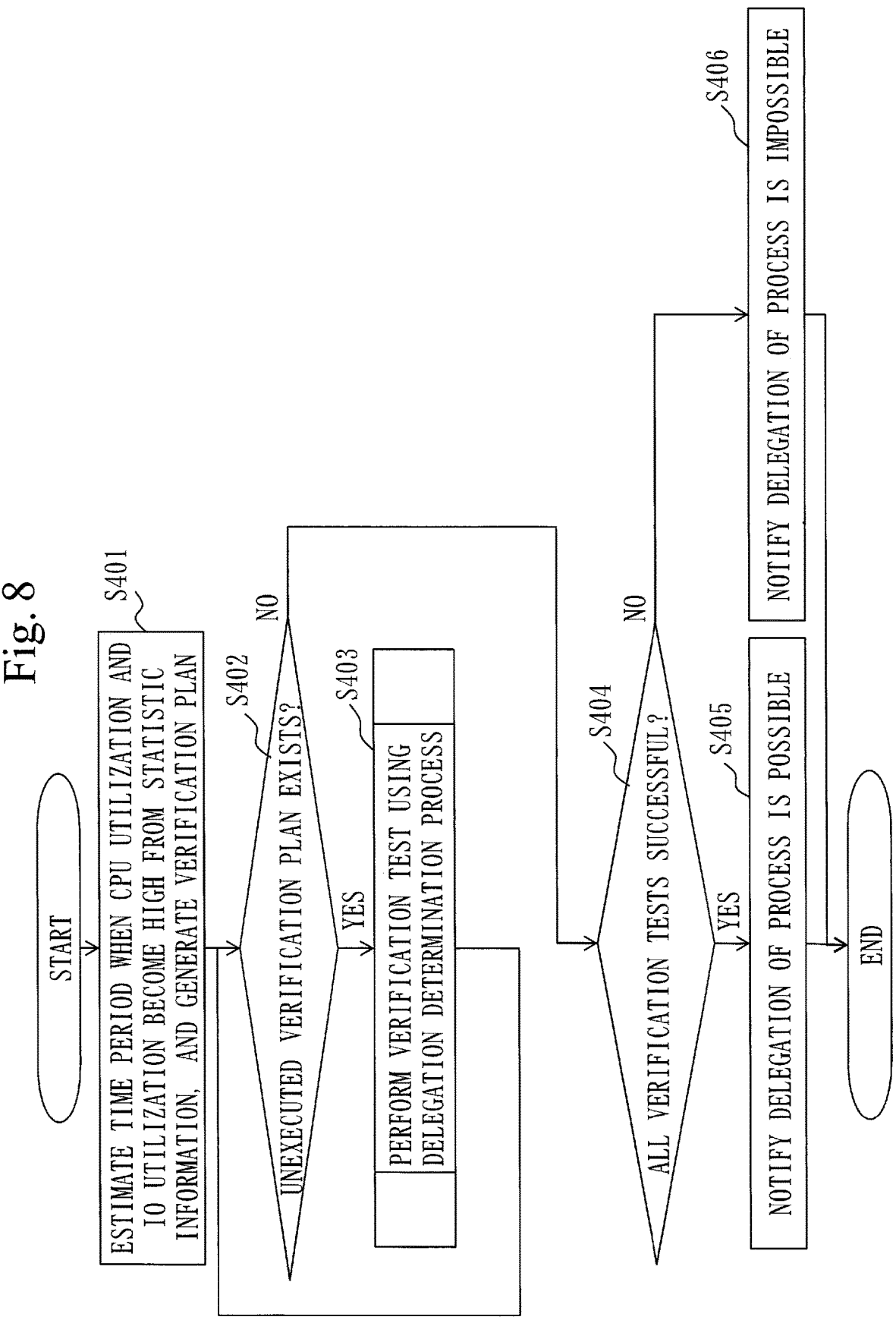
FIG. 8 is a flowchart illustrating an example of delegation determination processing in the gateway device according to the first embodiment.

Next, based on a flowchart illustrated in FIG. 8, delegation determination processing by the delegation determination unit 114 of the gateway device 111 will be described.

In a step S401, the delegation determination unit 114 estimates a time period when CPU utilization and IO utilization become high from the statistic information, and generates a verification plan to perform a verification test in a time period when the CPU utilization and the IO utilization are estimated to be high. In the verification plan, a plurality of times of verification tests may be planned.

In a step S402, the delegation determination unit 114 determines whether there is an unexecuted verification plan. When there is an unexecuted verification plan, processing proceeds to a step S403. Meanwhile, when there is no unexecuted verification plan, processing proceeds to a step S404.

In the step S403, the delegation determination unit 114 executes a verification test using the delegation determination process 117. The step S403 will be described in detail later with reference to FIG. 9.

In a step S404, the delegation determination unit 114 determines whether all verification tests have been successfully completed. When all the verification tests have been successfully completed, processing proceeds to S405. Meanwhile, when any of the verification tests fail, processing proceeds to S406.

Figure 9:
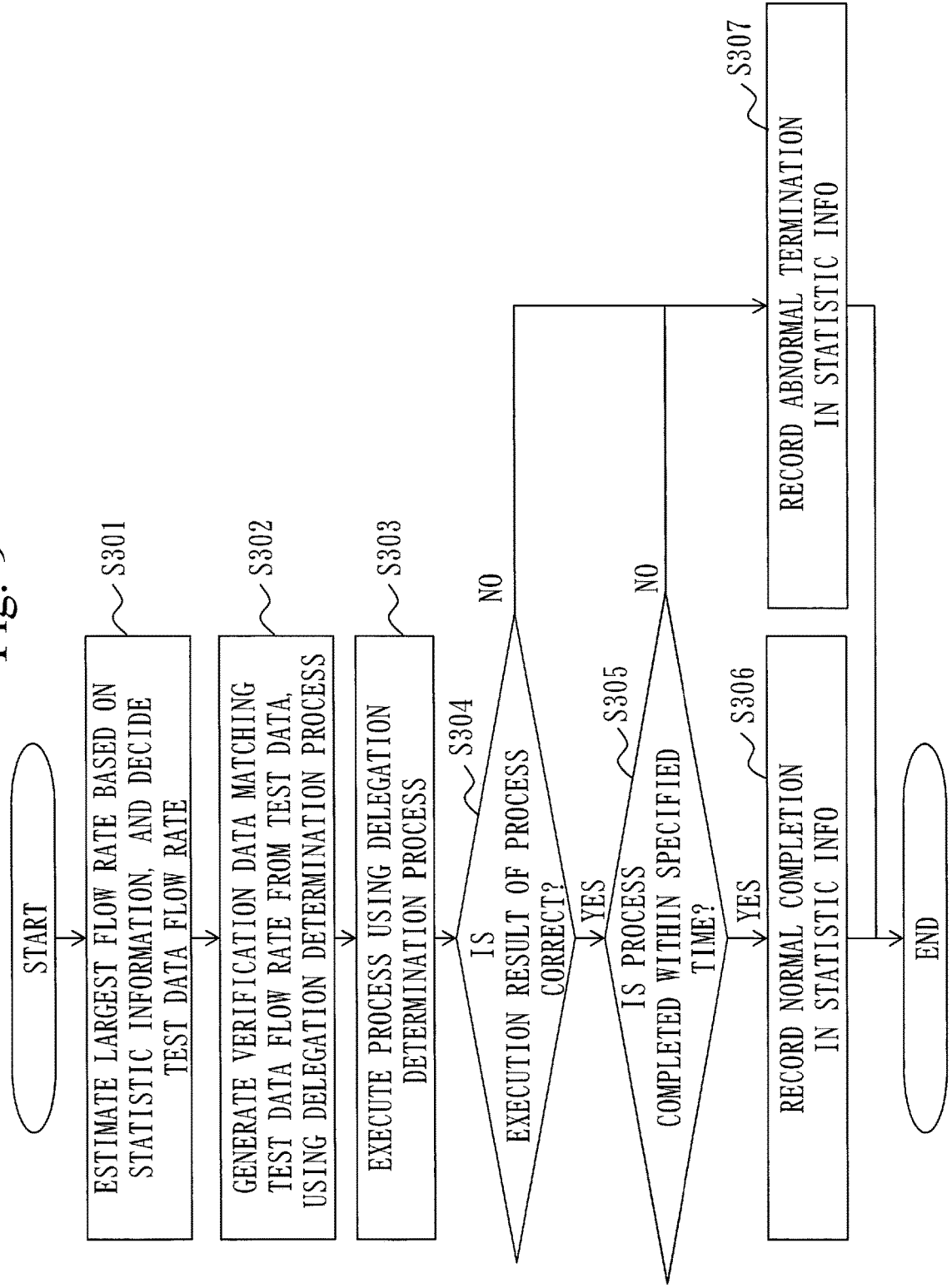
FIG. 9 is a flowchart illustrating an example of verification processing in the gateway device according to the first embodiment.

Success of the verification test means that a step S306 in FIG. 9 to be discussed below is performed, and normal completion is recorded in the statistic information 120. Failure of the verification test means that a step S307 in FIG. 9 to be discussed below is performed, and abnormal termination is recorded in the statistic information 120.

In a step S405, the delegation determination unit 114 notifies the server device 101 that it is possible to delegate the process, via the data transmission/reception unit 112. That is, the delegation determination unit 114 transmits the affirmative delegation determination result to the server device 101 via the data transmission/reception unit 112.

In a step S406, the delegation determination unit 114 notifies the server device 101 that it is impossible to delegate the process, via the data transmission/reception unit 112. That is, the delegation determination unit 114 transmits the negative delegation determination result to the server device 101 via the data transmission/reception unit 112.

Next, based on the flowchart illustrated in FIG. 9, verification processing by the delegation determination unit 114 of the gateway device 111 will be described.

In a step S301, the delegation determination unit 114 estimates, based on the statistic information, the largest flow rate from dispersion of flow rates of data that have been received before, and decides a test data flow rate.

That is, when a process being a delegation candidate is delegated from the server device 101, the delegation determination unit 114 estimates a data volume of data to be used in execution of the process, and decides the test data flow rate.

When a process to be executed using data from the sensing device 121 connected to the gateway device 111 is a process being a delegation candidate, the delegation determination unit 114 decides the test data flow rate based on the data flow rate of the data from the sensing device 121.

The delegation determination unit 114 estimates, for example, the largest data volume that has been received before as the largest flow rate. Otherwise, the delegation determination unit 114 may estimate the largest flow rate by taking+3σ from a probability distribution for which a normal distribution is assumed.

Further, the delegation determination unit 114 makes the largest flow rate estimated be the test data flow rate.

In a step S302, the delegation determination unit 114 generates verification data matching the test data flow rate from the test data 118 using the delegation determination process 117.

For example, when the data volume of the test data 118 received from the server device 101 is less than the test data flow rate decided in the step S301, the data volume of the test data 118 is expanded to the test data flow rate.

For example, when the data volume of the test data is n, and the test data flow rate is m, the data volume of the verification data can be n*ceil(m/n). Here, ceil( ) is a function to round up numbers after the decimal point. In order to make the data volume of the test data be the test data flow rate, it is considered, for example, to copy the test data repeatedly for the number of times equivalent to ceil (m/n).

In a step S303, the delegation determination unit 114 uses the delegation determination process 117, and executes the process 116 with respect to the verification data.

In a step S304, the delegation determination unit 114 compares the execution result with the correct data 119. When the execution result is correct, i.e., the execution result coincides with the correct data 119, processing proceeds to a step S305. Meanwhile, when the execution result is not correct, i.e., the execution result does not coincide with the correct data 119, processing proceeds to a step S307.

In the step S305, the delegation determination unit 114 determines whether the execution of the process 116 is completed within a prescribed time. When the execution of the process 116 is completed within the prescribed time, processing proceeds to a step S306. Meanwhile, when the execution of the process 116 is not completed within the prescribed time, processing proceeds to a step S307.

In the step S306, the delegation determination unit 114 records normal completion in the statistic information 120.

In the step S307, the delegation determination unit 114 records abnormal termination in the statistic information 120.

Figure 13:
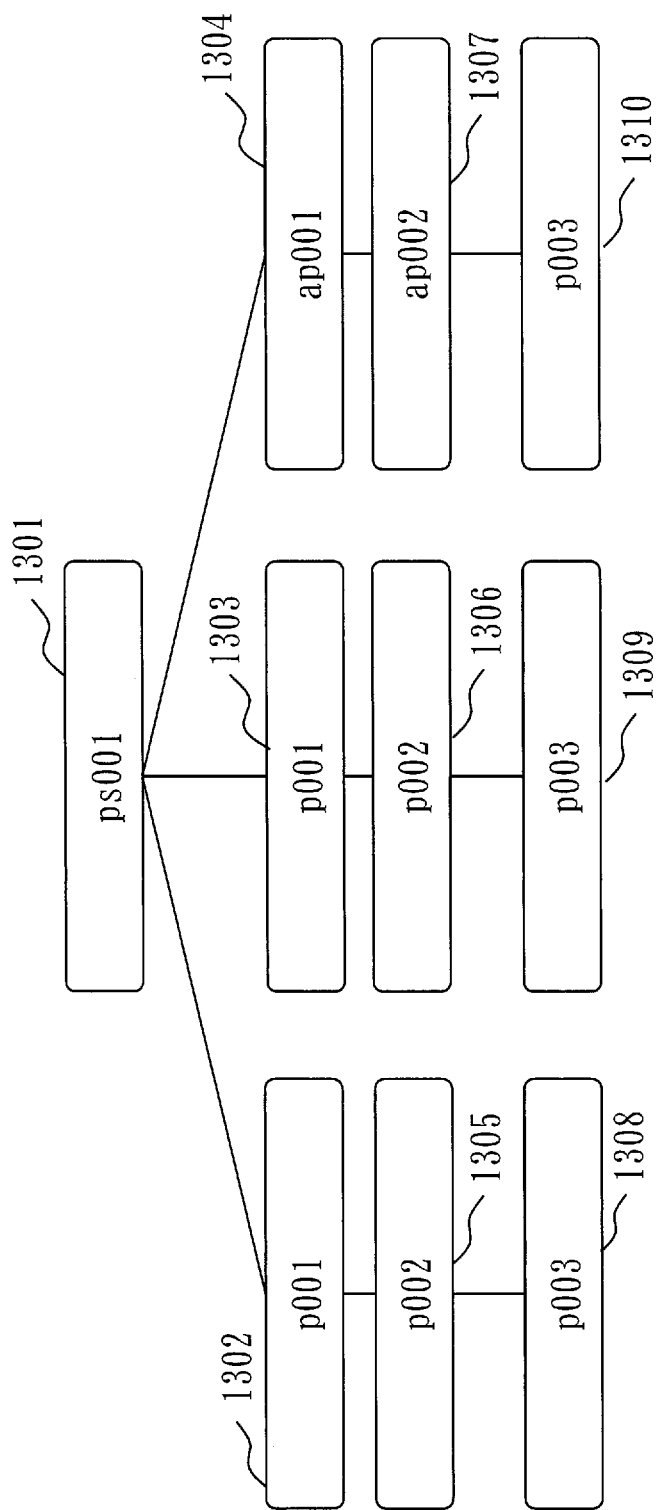
FIG. 13 is a diagram illustrating an example of a job execution plan after update according to the first embodiment.

Next, a specific example of the operation of the server device 101 and the gateway device 111 according to the present embodiment will be described using an example of a delegation state management table in FIG. 10, an example of a job execution plan in FIG. 11, an example of a delegation state management table after update in FIG. 12, and an example of a job execution plan after update in FIG. 13.

Here, it is assumed that the delegation state management table illustrated in FIG. 10 is stored in the data storage area 105 of the server device 101. Further, it is assumed that the job execution plan illustrated in FIG. 11 is stored in the data storage area 105 of the server device 101.

First, execution of the example of the job execution plan illustrated in FIG. 11 will be described. In the job execution plan illustrated in FIG. 11, there is a master process "ps001" executed by the server device 101, in the root node. The master process "ps001" is executed by using execution results of three slave processes (1102 through 1104).

In the delegation state management table in FIG. 10, all processes are delegated to the gateway device 111 of "gw001". Further, in the gateway device 111 of "gw002", a process "p002" is in a waiting state of delegation determination. Further, in the gateway device 111 of "gw003", only a process "p003" can be delegated.

Since all the processes are delegated in the gateway device 111 of "gw001", the execution result of the process "p001" is transmitted to the server device 101 from the gateway device 111 of "gw001".

Since the process "p002" is in the waiting state of delegation determination in the gateway device 111 of "gw002", the upper level process "p001" is executed in the server device 101. Therefore, only the execution result of the process "p003" is transmitted to the server device 101 from the gateway device 111 of "gw002".

Since only the process "p003" is delegated in the gateway device 111 of "gw003", only the execution result of the process "p003" is transmitted to the server device 101 from the gateway device 111 of "gw003".

The job execution unit 103 executes the alternative process 109 for a process for which the execution result cannot be obtained from the gateway device 111. In this manner, the job execution unit 103 can execute a job based on a process delegation status to the gateway device 111.

Figure 11:
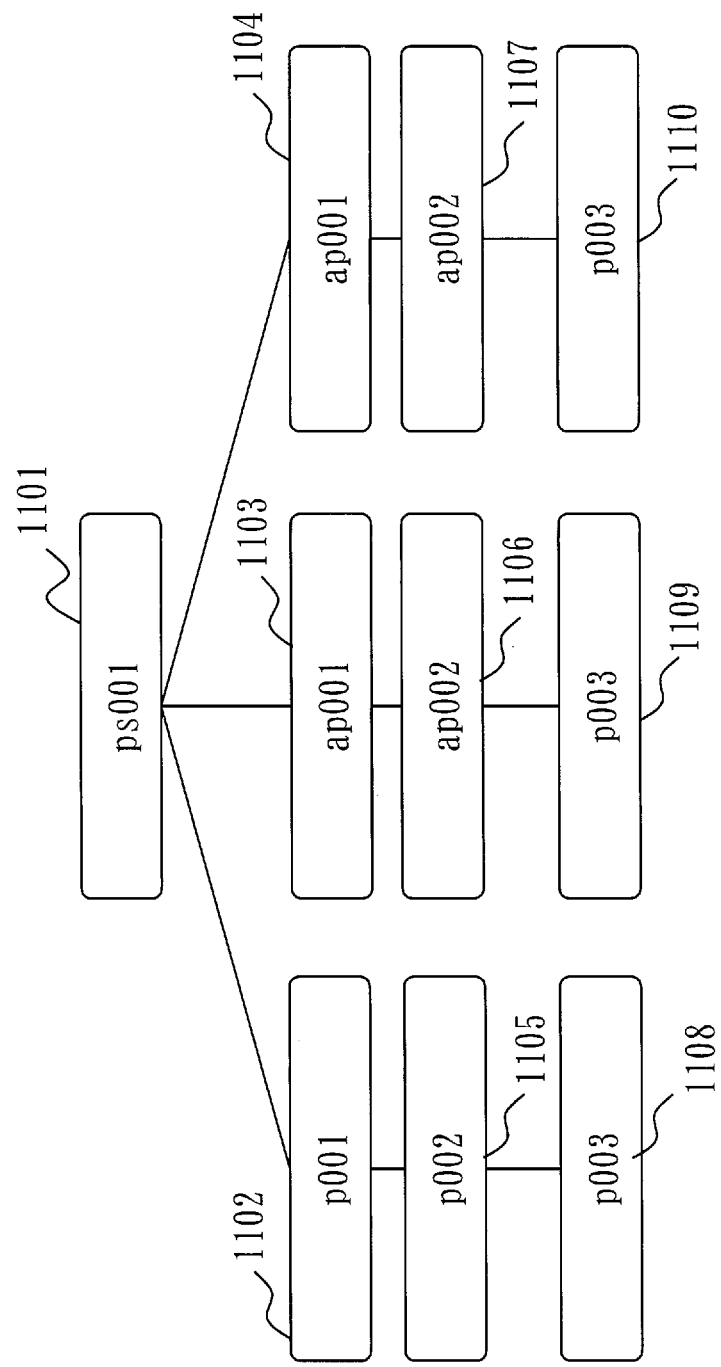
FIG. 11 is a diagram illustrating an example of a job execution plan according to the first embodiment.

Next, explanation is provided of updating of the delegation state management table illustrated in FIG. 10, and of the job execution plan illustrated in FIG. 11. Hereinafter, it is described that the delegation state management table illustrated in FIG. 10 and the job execution plan illustrated in FIG. 11 are updated to a delegation state management table illustrated in FIG. 12 and a job execution plan illustrated in FIG. 13.

Here, it is assumed that the server device 101 receives an affirmative delegation determination result from the gateway device 111 of "gw002" with respect to the process "p002" whose delegation status is in the waiting state of delegation determination "?" in FIG. 10. The delegation state management unit 104 receives a device ID and a job ID of "gw002", and a process ID of "p002", and obtains a row to be updated from the delegation state management table. The delegation state management unit 104 updates a delegation status 1006 of the row obtained to "Y". Further, the delegation state management unit 104 changes the alternative process ID to the process ID, like changing "ap002" 1106 of the job execution plan to "p002" 1306, and reflects to the job execution plan that the process is delegated to the gateway device 111. Next, the delegation state management unit 104 changes the alternative process ID to the process ID, like changing "ap001" 1103 of the job execution plan to "p001" 1303, and reflects to the job execution plan that the process is delegated to the gateway device 111.

*Explanation of Effect of Embodiment*

As described above, according to the present embodiment, a process is delegated from a server device only to a gateway device wherein a correct execution result can be obtained. Conventionally, it has been impossible for a server device to recognize that a correct execution result is obtained from a process delegated to a gateway device. Thus, it has been difficult to ensure that an execution result of a process in the gateway device is the same as an execution result of the process in the server device. In the present embodiment, it is possible to ensure that an execution result of the process delegated in the gateway device is the same as an execution result in the server device.

Further, in the present embodiment, the server device can execute a job while distinguishing a process delegated to the gateway device from a process that is not delegated.

Second Embodiment

In the second embodiment, explanation is provided of an operation in a case wherein it becomes impossible for a gateway device to execute a process delegated to the gateway device.

*Explanation of Configuration*

Figure 14:
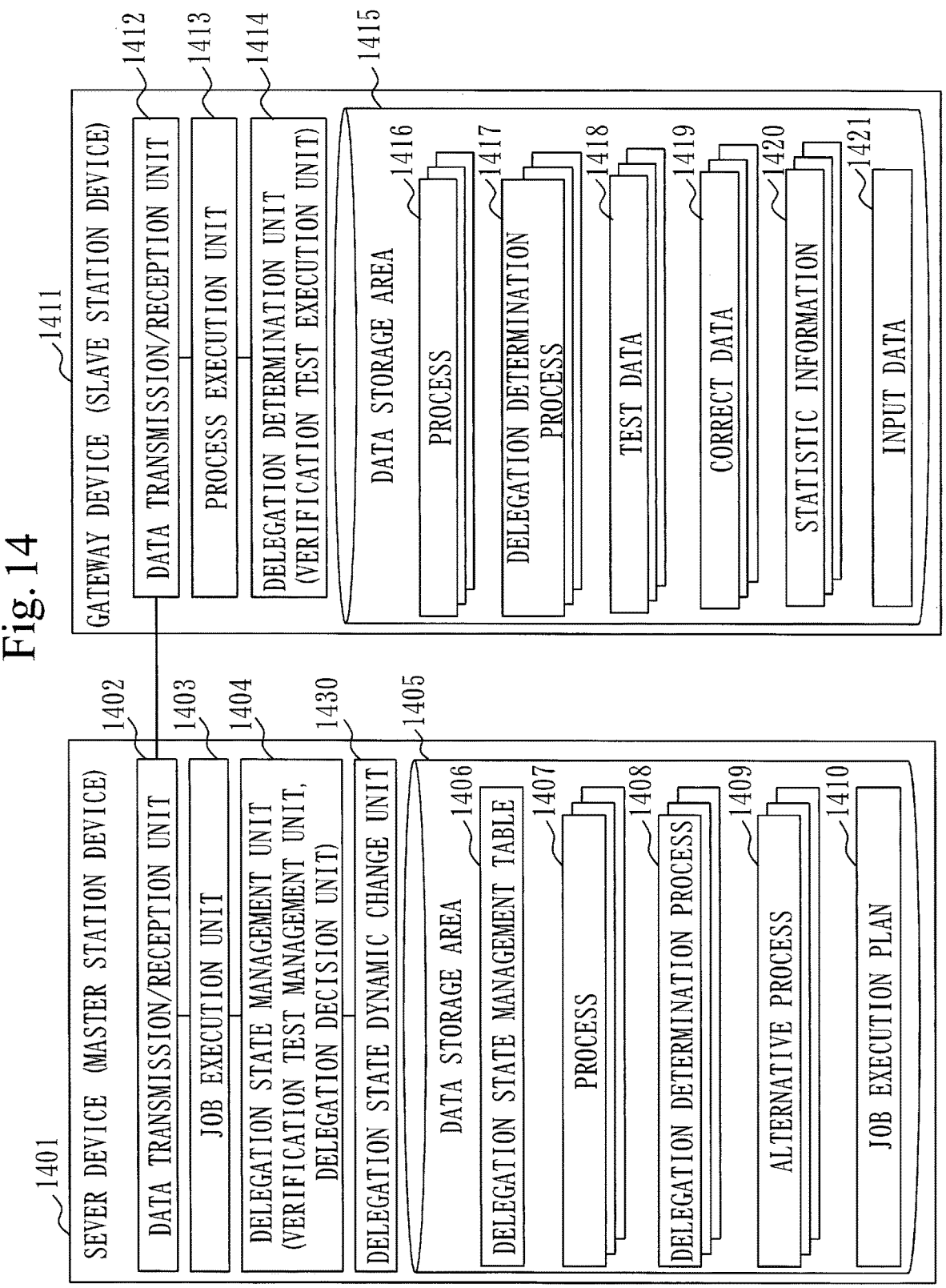
FIG. 14 is a diagram illustrating an example of a functional configuration of a server device and a gateway device according to a second embodiment.

FIG. 14 illustrates a configuration example of a server device 1401 and a gateway device 1411 according to the second embodiment.

In the server device 1401 of FIG. 14, a delegation state dynamic change unit 1430 is added compared to the server device 101 of FIG. 1. Further, in the gateway device 1411 of FIG. 14, input data 1421 is added compared to the gateway device 111 of FIG. 1.

The elements other than the delegation state dynamic change unit 1430 and the input data 1421 are the same as the elements with the same names indicated in FIG. 1.

Further, an example of a hardware configuration of the server device 1401 and the gateway device 1411 is substantially the same as that described in FIG. 5. In the server device 1401, the delegation state dynamic change unit 1430 is configured by a program, and the program to realize the delegation state dynamic change unit 1430 is executed by a processor 901.

Hereinafter, explanation is provided mainly of differences from the first embodiment.

The matters that are not described in the following are the same as those in the first embodiment.

*Explanation of Operation*

Figure 15:
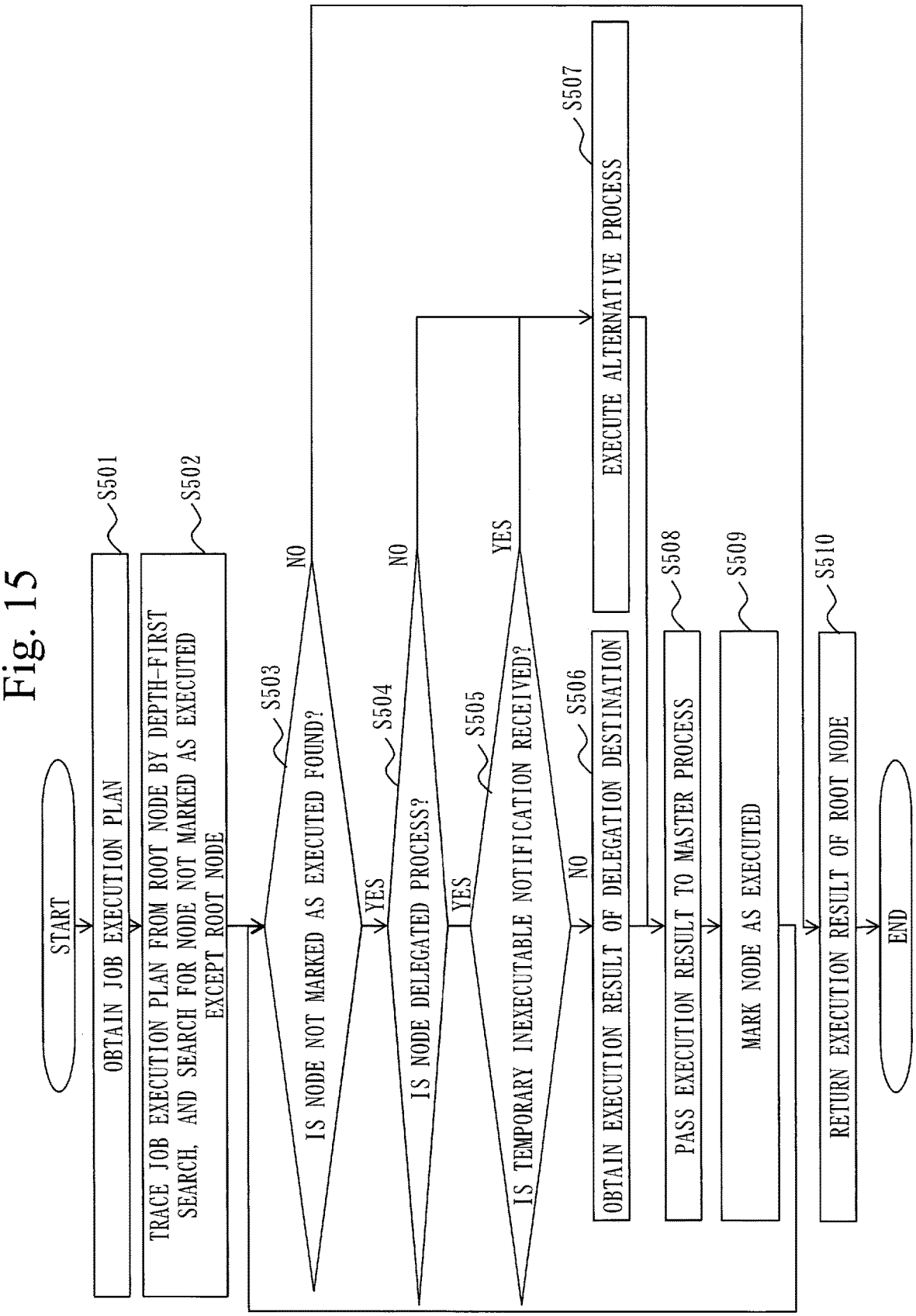
FIG. 15 is a flowchart illustrating an example of job execution processing in the server device according to the second embodiment.

Hereinafter, based on a flowchart illustrated in FIG. 15, job execution processing by a job execution unit 1403 of the server device 1401 will be described.

Figure 7:
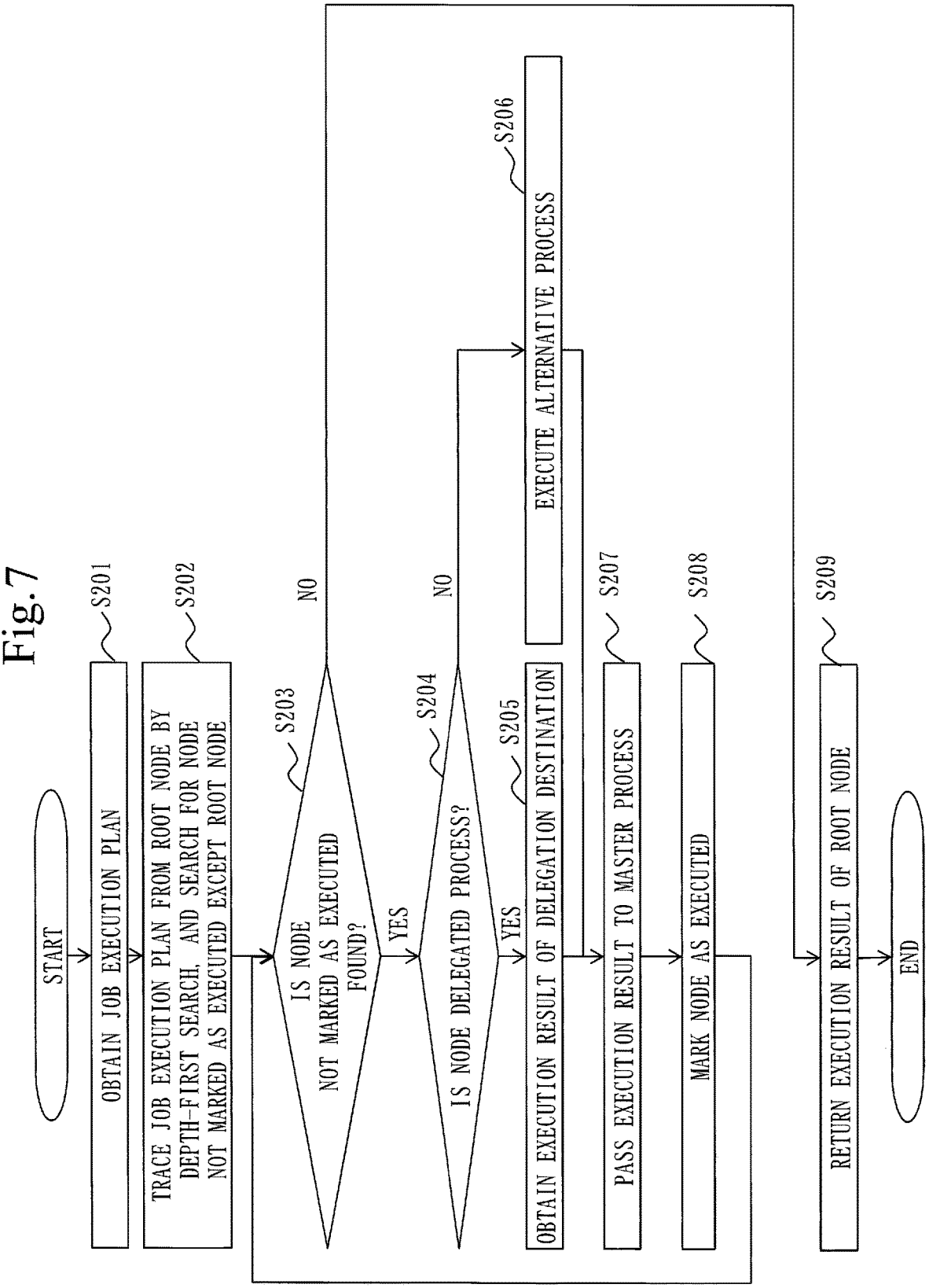
FIG. 7 is a flowchart illustrating an example of job execution processing in the server device according to the first embodiment.

Since steps S501 through S504 are the same as the steps S201 through S204 in FIG. 7, the explanation thereof is omitted.

In a step S505, the job execution unit 1403 determines whether a temporary inexecutable notification concerning a process delegated to the gateway device 1411 has been received.

The temporary inexecutable notification is a message to notify that it becomes temporarily impossible to execute the process delegated to the gateway device 1411.

When the temporary inexecutable notification has not been received, processing proceeds to a step S506, and when the temporary inexecutable notification has been received, processing proceeds to a step S507.

In the step S506, the job execution unit 1403 obtains an execution result of the gateway device 1411 as in S205 in FIG. 7.

Further, in the step S507, the job execution unit 1403 executes an alternative process 1409 as in S206 in FIG. 7.

As described above, the job execution unit 1403 according to the present embodiment obtains, when it is not notified from the gateway device 1411 that it becomes impossible to execute the process, an execution result of the process in the gateway device 1411, and executes the alternative process 1409 when it is notified from the gateway device 1411 that it becomes impossible to execute the process.

Further, when the temporary inexecutable notification has been received, the job execution unit 1403 notifies the delegation state dynamic change unit 1430 that the temporary inexecutable notification has been received. The delegation state dynamic change unit 1430 updates a delegation status regarding a pertinent gateway device and a pertinent process from "Y" to "N" in a delegation state management table 1406.

Furthermore, when a recovery notification has been received from the gateway device 1411 in addition to the execution result, the job execution unit 1403 notifies the delegation state dynamic change unit 1430 that the recovery notification has been received. The recovery notification is a message to notify that it becomes possible for the gateway device 1411 that has transmitted the temporary inexecutable notification to execute the process again. When reception of the recovery notification has been notified, the delegation state dynamic change unit 1430 updates a delegation status concerning the pertinent gateway device and the pertinent process from "N" to "Y" in the delegation state management table 1406.

Since steps S508 through S510 are the same as the steps S207 through S209 in FIG. 7, the explanation thereof is omitted.

Hereinafter, based on a flowchart illustrated in FIG. 16, process execution processing by a process execution unit 1413 of the gateway device 1411 will be described.

In a step S601, the process execution unit 1413 activates a process 1416. That is, the process execution unit 1413 executes the process 1416. The process 1416 stores data input in the input data 1421.

In a step S602, the process execution unit 1413 waits for a fixed time.

In a step S603, it is determined whether the execution of the process 1416 is completed. When the execution of the process is completed, processing proceeds to a step S606. Meanwhile, when the execution of the process 1416 is not completed, processing proceeds to a step S604.

In the step S604, when an execution time of the process 1416 exceeds a specified time, i.e., when the execution of the process 1416 is not completed within the specified time, processing proceeds to a step S605. Meanwhile, when the execution time of the process 1416 does not exceed the specified time, processing proceeds to the step S602.

In the step S605, the process execution unit 1413 suspends the execution of the process 1416, and transmits the input data 1421 and the temporary inexecutable notification of the process to the server device 1401 or an upper level gateway device 1411.

In the step S606, the process execution unit 1413 transmits the execution result of the process 1416 to the server device 1401 or the upper level gateway device 1411.

In a case wherein the execution result of the process 1416 is transmitted for the first time after the temporary inexecutable notification has been transmitted to the server device 1401 or the upper level gateway device 1411, the process execution unit 1413 transmits a recovery notification as well to the server device 1401 or the upper level gateway device 1411.

*Explanation of Effect of Embodiment*

In the present embodiment, it is possible to dynamically change a delegation status of a gateway device after performing delegation.

Conventionally, it has been necessary to execute a process delegated inevitably in a gateway device; hence, delay of processing may have occurred in a case wherein a load on the gateway device has temporarily increased. In the present embodiment, the process delegated to the gateway device is treated as a process temporarily being not delegated depending on a process executing status in the gateway device, thereby it is possible to minimize delay of processing even in a case wherein a load on the gateway device temporarily increases.

*Explanation of Hardware Configuration*

Lastly, a supplementary explanation of the hardware configuration will be provided.

The processors 901 and 911 illustrated in FIG. 5 are integrated circuits (ICs) that perform processing.

The processors 901 and 911 are central processing units (CPUs), digital signal processors (DSPs), etc.

The storage devices 902 and 921 illustrated in FIG. 5 are random access memories (RAMs), read only memories (ROMs), flash memories, or hard disk drives (HDDs), etc.

The communication interfaces 903 and 913 illustrated in FIG. 5 include receivers to receive data, and transmitters to transmit data.

The communication interfaces 903 and 913 are, for example, communication chips or network interface cards (NICs).

Further, the storage devices 902 and 912 also store operating systems (OSs).

Then, at least a part of the OS is executed by the processor 901.

The processor 901 executes programs to realize the functions of the job execution unit 103, the delegation state management unit 104, the job execution unit 1403, the delegation state management unit 1404 and the delegation state dynamic change unit 1430 while executing at least a part of the OS.

Similarly, the processor 911 executes programs to realize the functions of the process execution unit 113, the delegation determination unit 114, the process execution unit 1413 and the delegation determination unit 1414 while executing at least a part of the OS.

Hereinafter, the job execution unit 103, the delegation state management unit 104, the job execution unit 1403, the delegation state management unit 1404, the delegation state dynamic change unit 1430, the process execution unit 113, the delegation determination unit 114, the process execution unit 1413 and the delegation determination unit 1414 are collectively referred to as "units".

By the processors 901 and 911 executing the OSs, task management, memory management, file management, communication control, etc. are performed.

Additionally, information, data, signal values or variable values indicating the results of the processing by the "units" are stored in the storage devices 902 and 912, or registers or cache memories in the processors 901 and 911.

Further, the programs to realize the functions of the "units" may be stored in a portable recording medium such as a magnetic disk, a flexible disk, an optical disc, a compact disk, a blue-ray (registered trademark) disc, a digital versatile disc (DVD), etc.

Furthermore, the "units" may be replaced with "circuits", "steps", "procedures" or "processing".

Further, the server devices 101 and 1401, and the gateway devices 111 and 1411 may be realized by electronic circuits such as logic integrated circuits (logic ICs), gate arrays (GAs), application specific integrated circuits (ASICs) or field-programmable gate arrays (FPGAs), etc.

In this case, the "units" are realized as parts of electronic circuits. The processors and the electronic circuits as described above are collectively referred to as "processing circuitry" as well.

REFERENCE SIGNS LIST

101: server device; 102: data transmission/reception unit; 103: job execution unit; 104: delegation state management unit; 105: data storage area; 106: delegation state management table; 107: process; 108: delegation determination process; 109: alternative process; 111: gateway device; 110: job execution plan; 112: data transmission/reception unit; 113: process execution unit; 114: delegation determination unit; 115: data storage area; 116: process; 117: delegation determination process; 118: test data; 119: correct data; 120: statistic information; 121: sensing device; 1401: server device; 1402: data transmission/reception unit; 1403: job execution unit; 1404: delegation state management unit; 1405: data storage area; 1406: delegation state management table; 1407: process; 1408: delegation determination process; 1409: alternative process; 1410: job execution plan; 1411: gateway device; 1412: data transmission/reception unit; 1413: process execution unit; 1414: delegation determination unit; 1415: data storage area; 1416: process; 1417: delegation determination process; 1418: test data; 1419: correct data; 1420: statistic information; 1421: input data; 1430: delegation state dynamic change unit.

The invention claimed is:

1. A master station device comprising:
processing circuitry to:
make a slave station device perform a verification test to verify whether an expected execution result is obtained in a case wherein a process being a delegation candidate is delegated to the slave station device and the process is executed by the slave station device; and
obtain a result of the verification test from the slave station device, and decide whether to delegate execution of the process to the slave station device, based on the result of the verification test obtained,
wherein the processing circuitry transmits to the slave station device test data and expected data that is an expected execution result obtained by execution of the process using the test data,
makes the slave station device estimate a data volume of data to be used for the execution of the process by the slave station device in a case wherein the process is delegated to the slave station device, and makes the slave station device adjust a data volume of the test data so as to be the data volume estimated,
makes, as the verification test, the slave station device execute the process using the test data whose data volume has been adjusted, and makes the slave station device determine whether an execution result of the process coincides with the expected data, and whether the execution of the process is completed within a specified time,
receives, as the result of the verification test, a determination result of the slave station device from the slave station device, and
decides to delegate the execution of the process to the slave station device in a case wherein the determination result received from the slave station device indicates that the execution result of the process coincides with the expected data and the execution of the process is completed within the specified time,
wherein the processing circuitry determines, at the execution timing of the process, whether execution of the process is delegated to the slave station device,
determines, in a case wherein the execution of the process is delegated to the slave station device, whether a notification that the execution of the process becomes impossible is made from the slave station device,
obtains the execution result obtained by executing the process in the slave station device when the notification that the execution of the process becomes impossible is not made from the slave station device, and executes the process when the notification that the execution of the process becomes impossible is made from the slave station device.

2. The master station device as defined in claim 1, wherein the processing circuitry transmits to the slave station device a delegation determination process for making the slave station device determine whether the execution result of the process coincides with the expected data, makes the slave station device execute the delegation determination process, and makes the slave station device determine whether the execution result of the process coincides with the expected data.

3. The master station device as defined in claim 1, wherein the processing circuitry determines, at an execution timing of the process, whether the execution of the process is delegated to the slave station device, obtains the execution result obtained by executing the process in the slave station device when the execution of the process is delegated to the slave station device, and executes the process when the execution of the process is not delegated to the slave station device.

4. The master station device as defined in claim 1, wherein the processing circuitry determines, at an execution timing of the process at a time or after when a notification that the execution of the process becomes impossible is made from the slave station device, that the process is not delegated to the slave station device.

5. A slave station device comprising:
processing circuitry to:
perform a verification test to verify whether an expected execution result is obtained in a case wherein a process being a delegation candidate is delegated from a master station device and the process is executed, and transmit a result of the verification test to the master station device; and
execute the process and transmit to the master station device an execution result obtained by execution of the process, in a case wherein the execution of the process is delegated from the master station device,
wherein the processing circuitry receives from the master station device test data and expected data that is an expected execution result obtained by execution of the process using the test data,
estimates a data volume of data to be used for the execution of the process in a case wherein the process is delegated from the master station device, and adjusts a data volume of the test data so as to be the data volume estimated,
executes, as the verification test, the process using the test data whose data volume has been adjusted, determines whether the execution result of the process coincides with the expected data, and whether the execution of the process is completed within a specified time,
transmits, as the result of the verification test, a determination result to the master station device,
in a case where the execution of process is delegated to the slave station device, determines whether the execution of the process becomes impossible,
transmits the execution result obtained by executing the process when the execution of the process is possible or a notification that the execution the process becomes impossible so that the process can he executed by the master station device.

6. The slave station device as defined in claim 5, wherein the processing circuitry receives a delegation determination process for determining whether the execution result of the process coincides with the expected data, executes the delegation determination process received, and determines whether the execution result of the process coincides with the expected data.

7. The slave station device as defined in claim 5, wherein the processing circuitry performs the verification test in a time period when a calculation load is statistically high.

8. The slave station device as defined in claim 5, wherein the processing circuitry notifies the master station device that the execution of the process becomes impossible, in a case wherein the execution of the process is not completed within the specified time.

9. A process delegation management method comprising:
transmitting to a slave station device, test data, and expected data that is an expected execution result obtained by execution of a process being a delegation candidate using the test data;
making the slave station device estimate a data volume of data to be used for the execution of the process by the slave station device in a case wherein the process is delegated to the slave station device, and making the slave station device adjust a data volume of the test data so as to be the data volume estimated;
making the slave station device perform a verification test to verify whether an expected execution result is obtained in a case wherein the process is delegated to the slave station device and the process is executed by the slave station device;
making, as the verification test, the slave station device execute the process using the test data whose data volume has been adjusted, and making the slave station device determine whether an execution result of the process coincides with the expected data, and whether the execution of the process is completed within a specified time;
receiving, as a result of the verification test, a determination result of the slave station device from the slave station device;
deciding to delegate the execution of the process to the slave station device in a case wherein the determination result received from the slave station device indicates that the execution result of the process coincides with the expected data and the execution of the process is completed within the specified time;
determining, in a case wherein the execution of the process is delegated to the slave station device, whether a notification that the execution of the process becomes impossible is made from the slave station device;
obtaining the execution result obtained by executing the process in the slave station when the notification that the execution of the process becomes impossible is not made from the slave station device; and
executing the process in a master station device when the notification that the execution of the process becomes impossible is made from the slave station device.

10. A process execution method comprising:
receiving from a master station device, test data, and expected data that is an expected execution result obtained by execution of a process being a delegation candidate using the test data;
estimating a data volume of data to be used for the execution of the process in a case wherein the process is delegated from the master station device, and adjusting a data volume of the test data so as to be the data volume estimated;
performing a verification test to verify whether an expected execution result is obtained in a case wherein the process is delegated from the master station device and the process is executed;

executing, as the verification test, the process using the test data whose data volume has been adjusted, determining whether the execution result of the process coincides with the expected data, and whether the execution of the process is completed within a specified time;

transmitting, as a result of the verification test, a determination result to the master station device;

determining, in a case where the execution of the process is delegated to the slave station, whether a notification that the execution of the process becomes impossible is made from the slave station device, executing the process and transmitting to the master station device an execution result obtained by the execution of the process, in a case wherein the execution of the process is delegated from the master station device and the notification that the execution of the process becomes impossible is not made from the slave station device, and executing the process on the master station device when the notification that the execution of the process becomes impossible is made from the slave station device.

* * * * *